United States Patent
Antipa

(10) Patent No.: US 9,519,401 B2
(45) Date of Patent: Dec. 13, 2016

(54) PROVIDING CONTEXT MENU BASED ON PREDICTED COMMANDS

(71) Applicant: Adobe Systems Incorporated, San Jose, CA (US)

(72) Inventor: Damien Antipa, Saint-Louis (FR)

(73) Assignee: Adobe Systems Incorporated, San Jose, CA (US)

( * ) Notice: Subject to any disclaimer, the term of this patent is extended or adjusted under 35 U.S.C. 154(b) by 279 days.

(21) Appl. No.: 14/030,136

(22) Filed: Sep. 18, 2013

(65) Prior Publication Data

US 2015/0082242 A1 Mar. 19, 2015

(51) Int. Cl.
G06F 3/0482 (2013.01)
H04N 1/00 (2006.01)
G06F 9/44 (2006.01)

(52) U.S. Cl.
CPC .......... *G06F 3/0482* (2013.01); *G06F 9/4443* (2013.01); *H04N 1/00509* (2013.01); *H04N 1/00517* (2013.01)

(58) Field of Classification Search
CPC .... G06F 3/0482; G06F 3/1204; G06F 9/4443; H04N 1/00517; H04N 1/00511; H04N 1/00509
See application file for complete search history.

(56) References Cited

U.S. PATENT DOCUMENTS

| | | | |
|---|---|---|---|
| 6,266,060 B1 * | 7/2001 | Roth ............................. | 715/853 |
| 6,622,119 B1 * | 9/2003 | Ramaswamy et al. ........... | 704/9 |
| 6,734,882 B1 * | 5/2004 | Becker ........................... | 715/815 |
| 8,392,836 B1 * | 3/2013 | Bau et al. ....................... | 715/739 |
| 8,631,350 B2 * | 1/2014 | Lepage et al. ................. | 715/810 |
| 8,904,286 B2 * | 12/2014 | Lee et al. ....................... | 715/708 |
| 2002/0175955 A1 * | 11/2002 | Gourdol et al. ............... | 345/821 |
| 2008/0222569 A1 * | 9/2008 | Champion et al. ............ | 715/834 |
| 2008/0228685 A1 * | 9/2008 | Shivaji-Rao et al. .......... | 706/46 |
| 2008/0256491 A1 * | 10/2008 | Ozaki ............................. | 715/838 |
| 2010/0107141 A1 * | 4/2010 | Fitzmaurice et al. ......... | 717/123 |
| 2010/0122164 A1 * | 5/2010 | Kay et al. ...................... | 715/708 |
| 2010/0229120 A1 * | 9/2010 | Inoue et al. ................... | 715/811 |
| 2011/0119628 A1 * | 5/2011 | Carter et al. .................. | 715/812 |
| 2011/0126154 A1 * | 5/2011 | Boehler et al. ............... | 715/811 |
| 2011/0264528 A1 * | 10/2011 | Whale ........................ | 705/14.58 |

(Continued)

OTHER PUBLICATIONS

Yoshida, User Command Prediction by Graph-Based Induction, 1994, IEEE.*

(Continued)

*Primary Examiner* — Nicholas Ulrich
(74) *Attorney, Agent, or Firm* — Kilpatrick Townsend & Stockton LLP

(57) ABSTRACT

Systems and methods are disclosed for providing a context menu based on predicted commands. One embodiment involves identifying historical commands previously performed in an application. The embodiment also involves determining that each of a subset of commands from the historical commands has a higher correlation with a trigger command than others of the plurality of historical commands. The embodiment also involves generating a context menu including the subset of commands in response to receiving a request for the context menu after performing the trigger command in the application.

16 Claims, 7 Drawing Sheets

(56) References Cited

U.S. PATENT DOCUMENTS

| | | | |
|---|---|---|---|
| 2012/0089915 A1* | 4/2012 | Flinn et al. ................... | 715/728 |
| 2013/0019182 A1* | 1/2013 | Gil ....................... | G06F 3/0482 |
| | | | 715/738 |
| 2014/0201672 A1* | 7/2014 | Borzello et al. .............. | 715/779 |
| 2014/0282178 A1* | 9/2014 | Borzello et al. .............. | 715/771 |
| 2015/0033188 A1* | 1/2015 | Devi ............................ | 715/824 |

OTHER PUBLICATIONS

Gorniak et al., Predicting Future User Actions by Observing Unmodified Applications, 2000, AAAI.*
Matejka et al., Community Commands: Command Recommendations for Software Applications, 2009, ACM.*
Davison et al., Predicting Sequences of User Actions, 1998, AAAI.*

* cited by examiner

PROVIDING CONTEXT MENU BASED ON PREDICTED COMMANDS

TECHNICAL FIELD

This disclosure relates generally to computer-implemented methods and systems and more particularly relates to providing a context menu based on predicted commands.

BACKGROUND

Computing applications can be developed for touch devices. Some devices, such as smart phones, may include small touch display areas. In some applications, a context menu can be accessed in response to inputs such as (but not limited to) right-clicking a mouse, pressing a hot key or combination of keys, etc.

Touch devices, such as smart phone, may be unsuitable for accessing the same version of a context menu that may be displayed on computing devices having larger display areas. For example, FIG. 1 is a modeling diagram depicting an application executed on a computing device with a small display screen. An application executed on the computing device may provide a context menu including commands 12 (e.g., "Command A," "Command B," etc.) that are associated with an object 10.

In some cases, a context menu may be too large in one or more dimensions for a user to view the full context menu on a smaller display screen. For example, FIG. 2 is a modeling diagram depicting a context menu 16 exceeding the size of the display screen of the computing device. Presenting a context menu 16 associated with object 10 may obscure some of the commands 12. In other cases, a context menu may be scaled to fit the smaller display such that one or more menu options are difficult for a user to discern. For example, FIG. 3 is a modeling diagram depicting a context menu 16 being scaled to fit the size of the display screen of the computing device. Scaling the context menu 16 may cause the text for one or more of the commands to be difficult to read on a display device having a small display area.

It is desirable to efficiently use available display area for displaying context menus in an application.

SUMMARY

One embodiment involves identifying historical commands previously performed in an application. The embodiment also involves determining that each of a subset of commands from the historical commands has a higher correlation with a trigger command than other historical commands. The embodiment also involves generating a context menu including the subset of commands in response to receiving a request for the context menu after performing the trigger command in the application.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
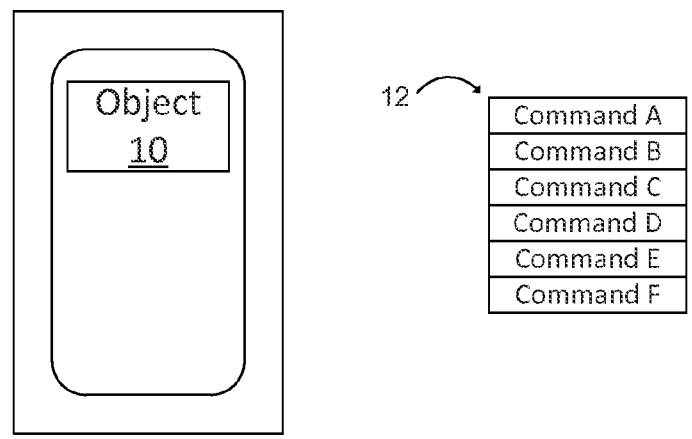
FIG. 1 is a modeling diagram depicting an application executed on a computing device with a small display screen.
Figure 2:
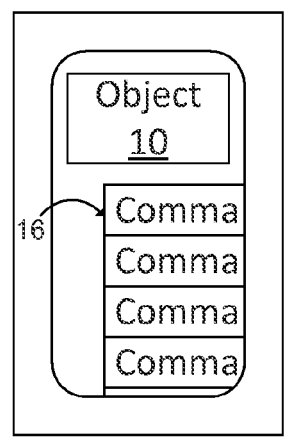
FIG. 2 is a modeling diagram depicting a context menu for the application exceeding the size of the display screen of the computing device.
Figure 3:
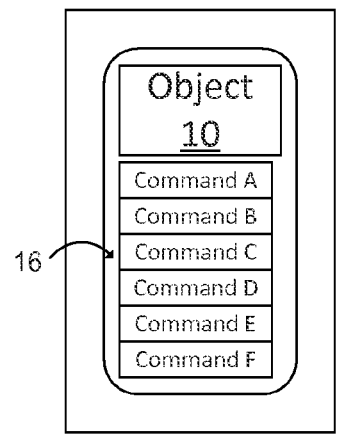
FIG. 3 is a modeling diagram depicting a context menu for the application being scaled to fit the size of the display screen of the computing device.

Computer-implemented systems and methods are disclosed for providing a context menu based on predicted commands.

The following non-limiting example is provided to help introduce the general subject matter of certain embodiments. An application that is executed on a device with a smaller display screen (e.g., a smart phone or tablet computer) can provide a context menu to a user in response to a suitable input. A context menu is a menu in a graphical interface that includes a limited set of commands that are available in the current context of the application. For example, a context menu may present a limited set of commands that can be performed on a selected object in the application rather than a full set of commands that can be performed in the application. For a device such as a smart phone or tablet, the set of commands for the selected object may include a larger number of commands than can be displayed on the display screen in a usable manner. For example, a display screen may be large enough to display only five commands from a context menu that includes ten commands. To resolve this issue, the application can select a subset of the commands for the context menu based on an analysis of previous sequences of commands performed in the application. For example, a previous sequence of commands may include a command to delete an existing object followed by a command to insert a new object. The application can determine that a "delete" command is more frequently followed by an "insert" command than any other command. The application can respond to a request for a context menu after a "delete" command is performed by providing a context menu that is limited to the "insert" command. The context menu being limited to the "insert" command can avoid cluttering a limited display area with commands that a user is less likely to select in a given context.

In accordance with one embodiment, a processing device can provide a context menu based on predicted commands. The processing device can identify historical commands previously performed in an application. The processing device can also determine a subset of the commands to be included in a context menu. The subset of commands can be determined based on each of the subset commands having a higher correlation with a trigger command than other historical commands. For example, an "insert" command can be highly correlated with a "delete" command or a "rename" command can be highly correlate with an "insert" command. A request for the context menu can be received after the trigger command is performed in the application. For example, rapidly tapping twice on an object after inserting the object in a graphical interface may request a context menu for the selected object. The processing device can generate a context menu including the subset of commands in response to the request. For example, a context menu provided after inserting a selected object may be limited to the commands highly correlated with an "insert" command, such as (but not limited to) a "rename" command.

As used herein, the term "command" refers to anything used to direct a computer to perform an operation or action, including but not limited to, receiving user input in the form of typing, selection of an icon, or selection of an option in a menu or elsewhere.

As used herein, the term "historical command" is used to refer to a command previously performed in the application. In some embodiments, a historical command can be recorded during a session in which a user or other entity uses the application. In additional or alternative embodiments, a historical command can be recorded during previous sessions in which the user or other entity uses the application.

As used herein, the term "correlation" is used to refer to a relationship between two or more commands. For example, a first command may be correlated with a second command based on the first command (e.g., an "insert object" command) historically being performed immediately before or immediately after the second command (e.g., a "delete object" command).

As used herein, the term "trigger command" is used to refer to a command used to determine, identify, or otherwise obtain one or more correlated commands. For example, a trigger command may be a command to insert an object where other commands are identified as correlated to the insert command and presented in a context menu based on that determined correlation. A trigger command may, but does not necessarily, initiate display of a context menu. For example, a computer system may respond to a selection of an insert command, by inserting an object and presenting a context menu with commands that are correlated with the insert command. In other instances, a computer system may respond to a selection of an insert command by inserting an object and then respond to a command initiating a context menu by presenting a context menu with commands that are correlated with the last received command, i.e., commands correlated with the insert command that was received immediately before the context menu command was received.

As used herein, the term "context menu" is used to refer to a menu in a graphical interface that includes a limited set of commands that are available in a current context of the application. A context for the application can be determined based at least in part on one or more recent inputs received to a graphical interface of the application. For example, a context for an application may be based at least in part on the selection of an object in a graphical interface. A context menu may include a limited set of commands that can be performed on the selected object in the application rather than a full set of commands that can be performed in the application.

In some embodiments, determining a correlation with a trigger command can include determining a frequency at which a given command has historically been performed subsequent to the trigger command being performed. For example, an application may access a log or other record that describes a history of commands performed in the application. The application can identify all instances in which an "insert" command was performed. For each instance in which an "insert" command was performed, the application can identify a respective command performed after the "insert" command. The application can determine that a "rename" command was performed after an "insert" command for 40% of the instances of the "insert" command, a "zoom" command was performed after an "insert" command for 30% of the instances of the "insert" command, a "copy" command was performed after an "insert" command for 20% of the instances of the "insert" command, and a "delete" command was performed after an "insert" command for 10% of the instances of the "insert" command. In some embodiments, a subset of commands can be selected for the context menu based on a threshold frequency. For example, the context menu following an "insert" command can include commands having a frequency greater than or equal to 25%. The "rename" and "zoom" commands can be included in the context menu and the "copy" and "delete" commands can be excluded from the context menu.

In additional or alternative embodiments, determining a correlation with a trigger command can include determining a frequency at which a given command is included in a sequence of commands that includes both the trigger command and at least one additional command. For example, a "rename" command can be frequently included in a sequence of commands that includes a "delete" command followed by an "insert" command. The application can select the "rename" command based on detecting the performance of a sequence of commands including both the "delete" command and the "insert" command.

As used herein, the term "sequence of commands" is used to refer to multiple commands being performed in an application, where each command in the sequence of commands is performed either immediately before or immediate after another command in the sequence of commands.

In some embodiments, the historical commands can be determined based on a profile of a user or other entity accessing the application during a session. The application can identify a profile associated with the session and select a record or other data describing the historical commands. The analysis of historical commands can be limited to the historical commands associated with the user profile. Limiting the analysis to the historical commands associated with the user profile can increase the relevance of the generated context menu to a given user accessing the application.

As used herein, the term "entity" is used to refer to an individual, organization, or other logical identity that can be uniquely identified by an application or service. An entity can be identified by reference to one or more client accounts and/or by reference to a software identifier and/or hardware identifier associated with an application and/or device used to execute, access, or otherwise use an application.

As used herein, the term "session" is used to refer to a period of time during which an entity executes, accesses, or otherwise uses an application. A session can be delineated by a first point in time at which an entity is authenticated to use the application and a second point in time at which the authentication is terminated (e.g., via the entity logging out of the application or the authentication expiring after a period of inactivity).

Figure 4:
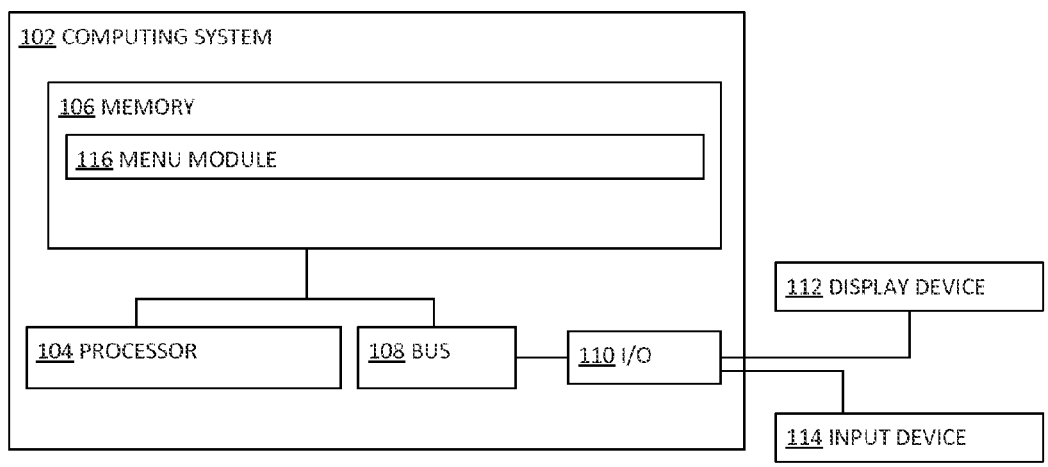
FIG. 4 is a block diagram depicting an example computing system for implementing certain embodiments.

Referring now to the drawings, FIG. 4 is a block diagram depicting an example computing system 102 for implementing certain embodiments.

The computing system 102 can include a processor 104 that is communicatively coupled to a memory 106 and that executes computer-executable program instructions and/or accesses information stored in the memory 106. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, causes the processor to perform the steps described herein.

The computing system 102 can also include a bus 108. The bus 108 can communicatively couple one or more components of the computing system 102.

The computing system 102 can also include and/or be communicatively coupled to a number of external or internal devices, such as input or output devices. For example, the computing system 102 is shown with an input/output ("I/O") interface 110, a display device 112, and an input device 114. Non-limiting examples of a display device 112 include a screen integrated with the computing system 102, a monitor external and coupled with the computing system, etc. Non-limiting examples of an input device 114 include a touch screen, a touch pad, an external mouse, etc. In some embodiments, the display device 112 and the input device 114 can be separate devices. In other embodiments, the display device 112 and the input device 114 can be integrated in the same device. For example, a display device 112 may be a screen and the input device 114 may be one or more components providing touch-screen functions for the display device, such as cameras for imaging a touch area or pressure sensors for detecting pressure changes caused by a touch.

The computing system 102 can modify, access, or otherwise use electronic content. The electronic content may be resident in any suitable computer-readable medium and execute on any suitable processor. In one embodiment, the electronic content can reside in the memory 106 at the computing system 102. In another embodiment, the electronic content can be accessed by the computing system 102 from a remote content provider via a data network.

The memory 106 can include any suitable computer-readable medium. A computer-readable medium may include, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A menu module 116 stored in the memory 106 can configure the processor 104 to generate a context menu for rendering in a graphical interface. In some embodiments, the menu module 116 can be a stand-alone application executed by the processor 104. In other embodiments, the menu module 116 can be a software module included in or accessible by a separate application executed by the processor 104 that is configured to modify, access, or otherwise use the electronic content.

The computing system 102 can include any suitable computing device for executing the menu module 116. Non-limiting examples of a computing device include a desktop computer, a tablet computer, a laptop computer, or any other computing device suitable for rendering the electronic content.

Figure 5:
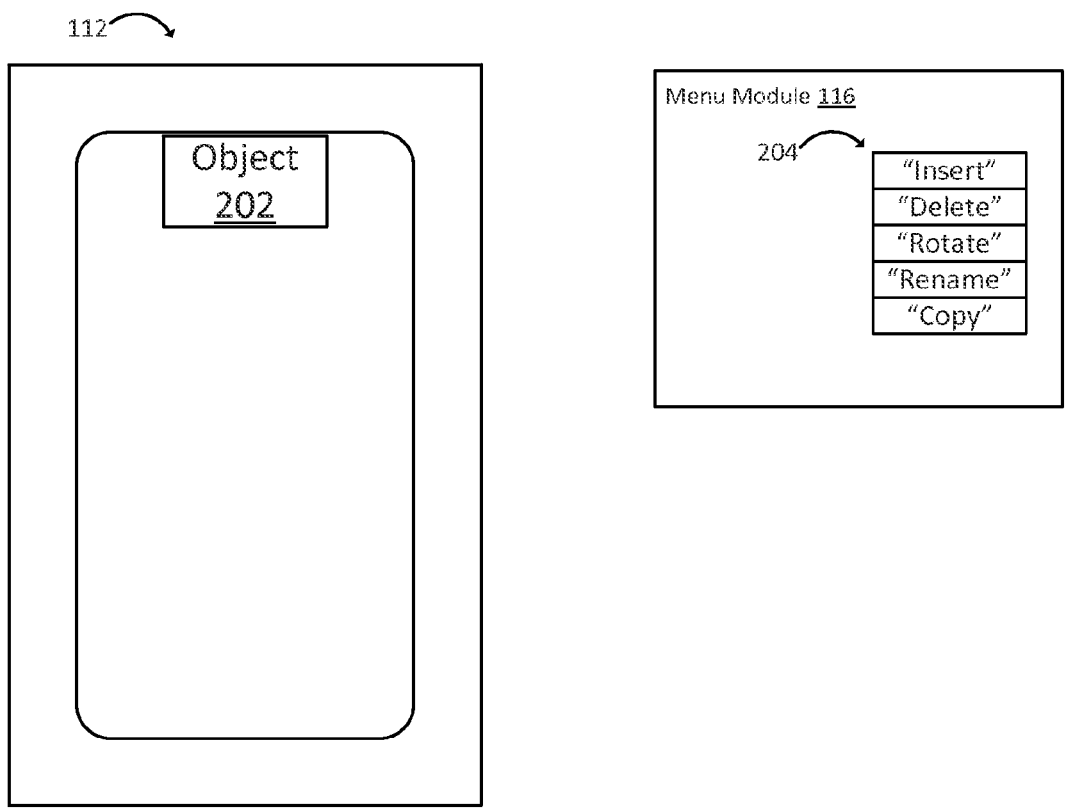
FIG. 5 is a modeling diagram depicting an application having a set of contextual commands associated with a selected object displayed on a display device having limited display area.

FIG. 5 is a modeling diagram depicting an application having a set of contextual commands 204 associated with a selected object 202 displayed on a display device 112 having limited display area. For example, a context for an application can be determined, identified, or otherwise defined based on an object 202 displayed on the display device 112. The menu module 116 can determine that a set of contextual commands 204 are associated with an object. Non-limiting examples of the contextual commands 204 include an "insert" command for inserting a new object, a "delete" command for deleting an object, a "rotate" command for rotating a selected object, a "rename" command for renaming a selected object, and a "copy" command for copying a selected object.

The display device 112 may be too small to display all of the contextual commands 204 in a context menu for the object 202. The menu module 116 can generate a context menu that is limited to predicted commands for a user or other entity by determining a correlation between triggering actions detected by the menu module 116 and one or more of the contextual commands 204. For example, the menu module 116 can analyze a history of past commands to determine a context in which the first command is performed. The menu module 116 can determine that a first command is historically followed by a second command or otherwise correlated with the second command. The menu module 116 can provide a context menu subset that includes the second command.

In a non-limiting example, the menu module 116 can generate a context menu based on recently performed commands or other trigger commands in an application, such as a development environment utilizing a Content Repository API for Java ("JCR"). A developer entity using the development environment may decide to reorganize objects or other components of a web application developed using the development environment. The developer may reorganize objects or other components by deleting unwanted objects, adding new objects, and renaming the new objects. The menu module 116 can determine that a developer that performs a trigger command, such as a "delete" command, that is associated with a given context (e.g. reorganizing or otherwise modifying component of a web application in a development environment) is likely to perform an additional "delete" command. The menu module 116 can also determine for the given context that the developer is likely to insert objects after deleting other objects and to rename the new objects after insertion. The menu module 116 can thus provide a context menu that includes a "delete" command, an "insert" command, and a "rename" command in response to detecting a context in which the user is deleting objects from an application in a development environment.

In some embodiments, the menu module 116 can be implemented on a web-based application. For example, a web-based development environment may include the menu module 116. The web-based development environment can log or otherwise record commands performed by a given entity in the development environment. The record of historical commands can be associated with a profile for the entity. For example, in a development environment using JCR, an entity can perform a REpresentational State Transfer ("REST") operation to modify or otherwise access an application under development. The menu module 116 can identify one or more commands from one or more REST operations. The menu module 116 can log or otherwise record the identified commands and associate the identified commands with a profile for the entity. For example, the menu module 116 can record a predetermined number of recent commands (e.g., the ten most recent commands) and record switches between different commands (i.e., sequences of different commands). Analyzing switches between different commands can allow the menu module 116 to identify patterns in the actions of the entity with respect to a development environment or other application. In a non-limiting example, an entity can select objects in a web application under development by clicking the objects using a mouse pointer or by triggering a touch event on a touch-based input device. The selection command can be sent via an Asynchronous JavaScript and XML ("AJAX") request or other suitable request to a server at which the menu module 116 is executed. Based on the analyzed information about the entity's use of historical commands, the menu module executed on the server can respond to a selection with a context menu limited to commands predicted from the entity's historical commands. The commands in the context menu can be commands correlated with a trigger command.

Figure 6:
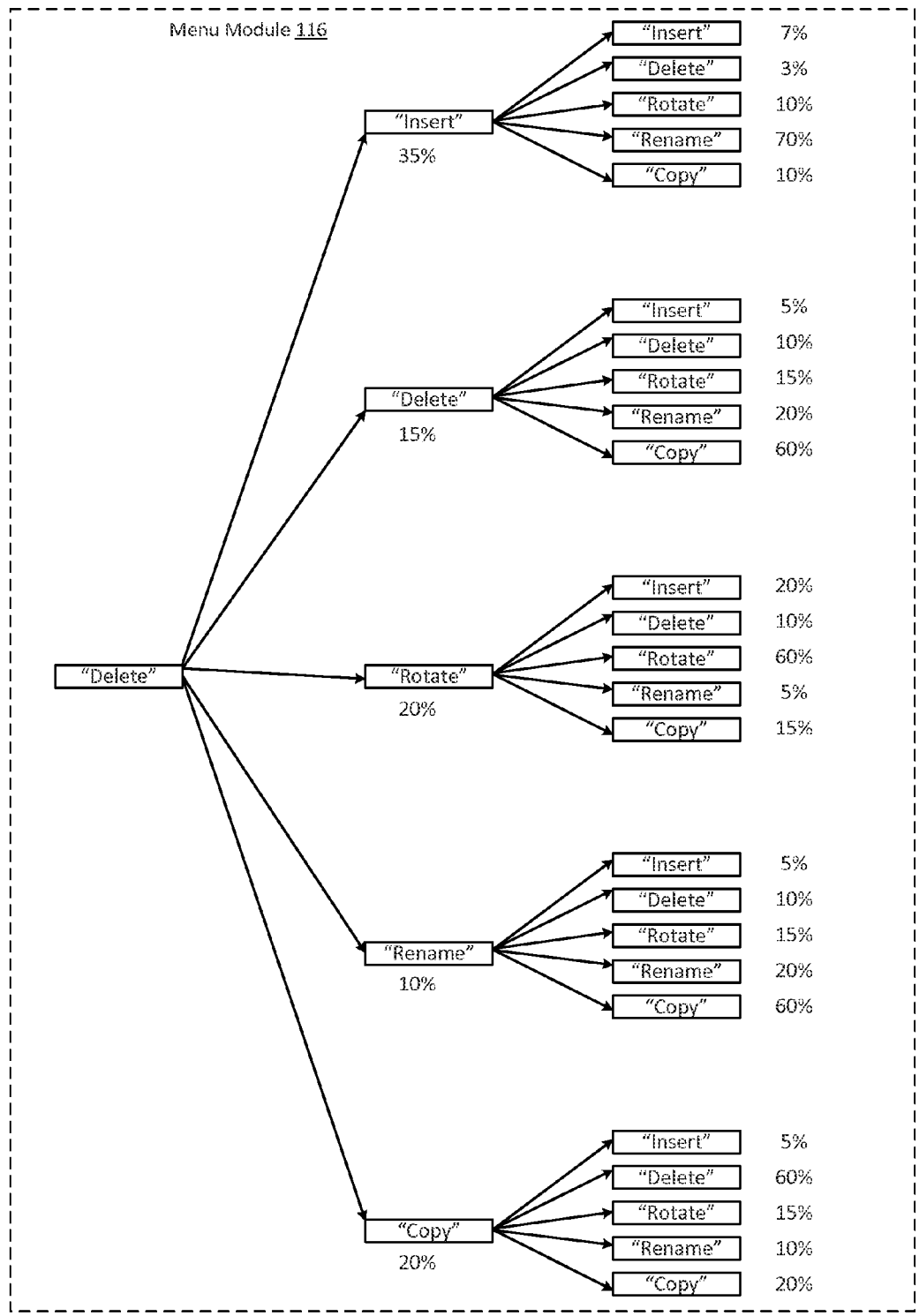
FIG. 6 is a modeling diagram depicting an example graph for determining a correlation between a trigger command and other commands of the context menu.

FIG. 6 is a modeling diagram depicting an example graph for determining a correlation between a trigger command and other commands of the context menu. The graph can be used to identify correlations between different commands that can be performed with respect to the object 202. For example, the menu module 116 may access a log or other record that describes a usage history for the contextual commands 204. The menu module 116 can identify all instances in which a "delete" command was performed. For each instance in which a "delete" command was performed, the menu module 116 can identify which of the contextual commands 204 have historically been performed after the "delete" command. As depicted in FIG. 6, the menu module 116 can determine that an "insert" command was performed after a "delete" command for 35% of the instances of the "delete" command, that an additional "delete" command was performed after a "delete" command for 15% of the instances of the "delete" command, that a "rotate" command was performed after a "delete" command for 20% of the instances of the "delete" command, that a "rename" command was performed after a "delete" command for 10% of the instances of the "delete" command, and that a "copy" command was performed after a "delete" command for 20% of the instances of the "delete" command.

In some embodiments, the menu module 116 can select a subset of the contextual commands 204 based on a threshold frequency at which each of the subset of commands is performed after a trigger command (e.g., a "delete" command"). For example, the context menu following a "delete" command can include commands having a frequency greater than or equal to 15%. The "insert," "rotate", and "copy" commands can be included in the context menu and the "delete" and "rename" commands can be excluded from the context menu.

In some embodiments, the menu module 116 can determine correlations between trigger commands and other contextual commands based on sequences of commands. For example, a user may delete two text blocks, add two images at the positions of the deleted text blocks, and update a name or description for the website based on the added components. The menu module 116 can respond to a subsequent deletion command by presenting a context menu with a subset of the full context menu commands where the subset includes the insertion command. The menu module 116 can determine a frequency at which a given command is associated with a sequence of two or more other commands.

For example, as depicted in FIG. 6, for a sequence of commands including a "delete" command and an "insert" command:
  a frequency of selecting an "insert" command can be 7%;
  a frequency of selecting a "delete" command can be 3%;
  a frequency of selecting a "rotate" command can be 10%;
  a frequency of selecting a "rename" command can be 70%; and
  a frequency of selecting a "copy" command can be 10%.
The menu module 116 can select commands for a context menu having a selection frequency of 10% or greater in response to detecting a sequence of commands including a "delete" command and an "insert" command.

Figure 7:
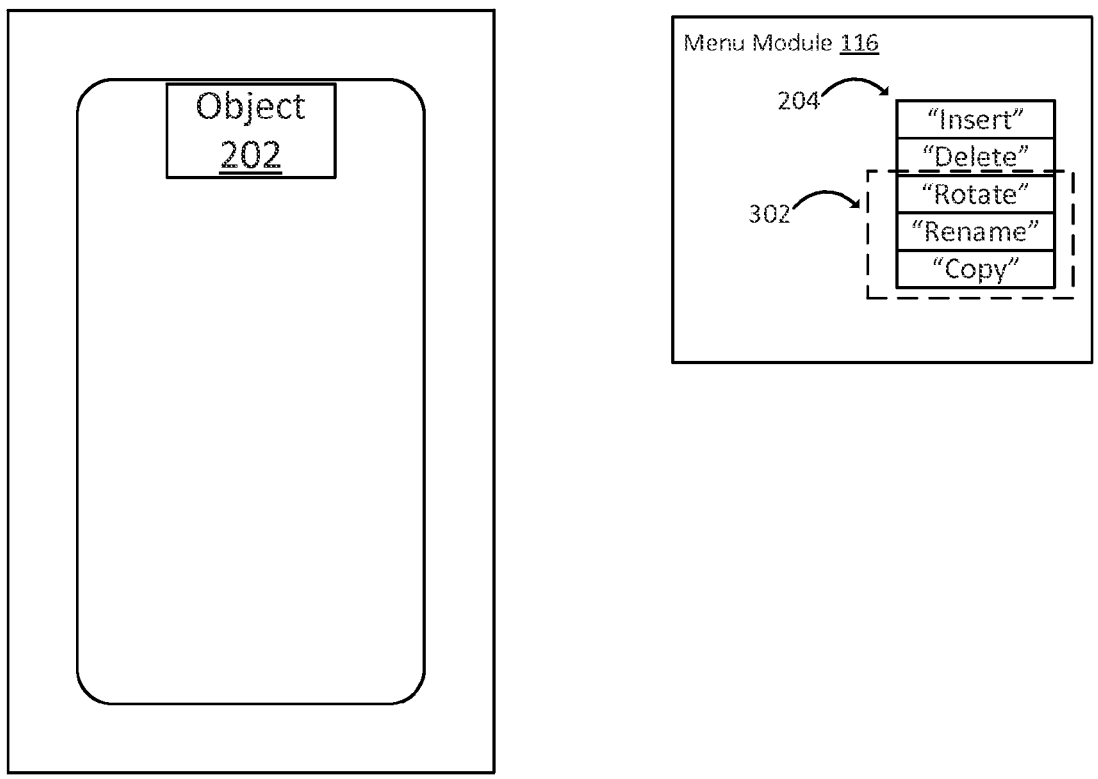
FIG. 7 is a modeling diagram depicting a selection of a subset of available commands in the context menu.

FIG. 7 is a modeling diagram depicting a selection of a subset 302 of available commands in the context menu. The menu module 116 can select the subset 302 based on the commands in the subset 302 having a higher correlation with a trigger command, as described above with respect to FIG. 6.

Figure 8:
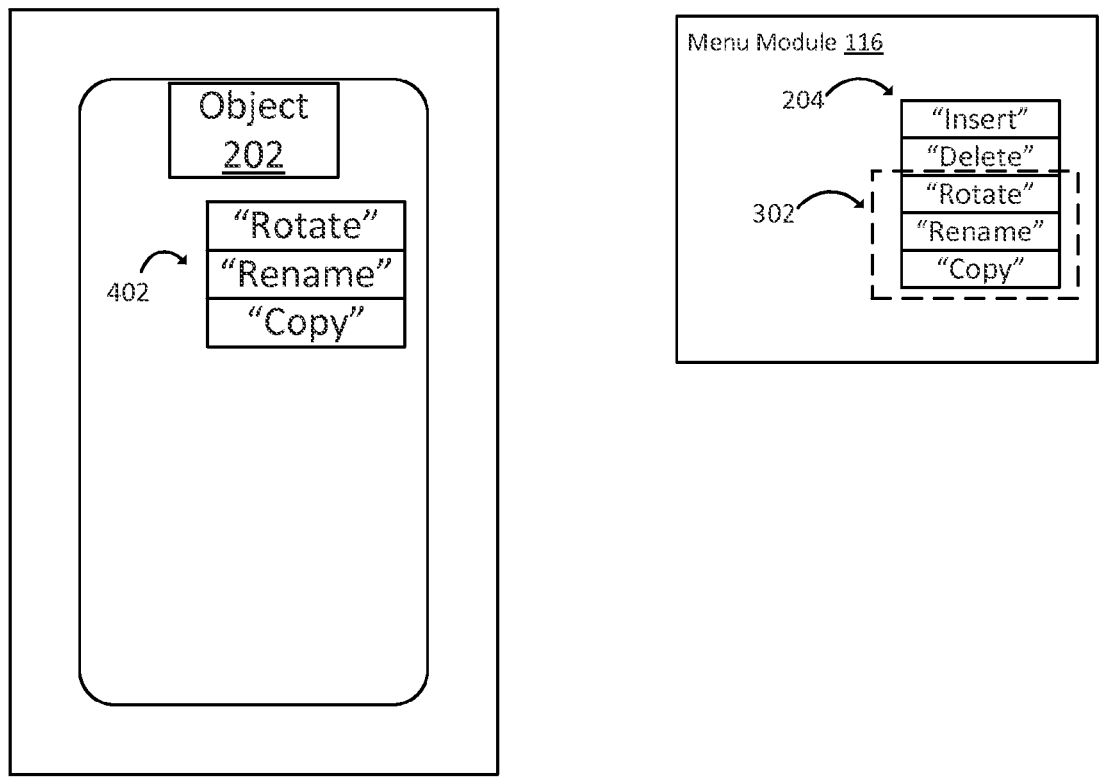
FIG. 8 is a modeling diagram depicting a context menu being provided that is limited to the selected subset of commands.

The subset 302 can be used to generate a context menu that is limited to the subset 302. For example, FIG. 8 is a modeling diagram depicting a context menu 402 being provided that is limited to the selected subset 302 of the contextual commands 204. The menu module 116 can update a list of historical commands based on which of the contextual commands 204 is selected from the context menu 402.

In some embodiments, the context menu 402 may not include one of the contextual commands 204 desired by a user. A user can provide an additional input representing a request for a full context menu. The full context menu can include all of the contextual commands 204. The full context menu can replace the context menu 402 in response to receiving the request for the full context menu.

Figure 9:
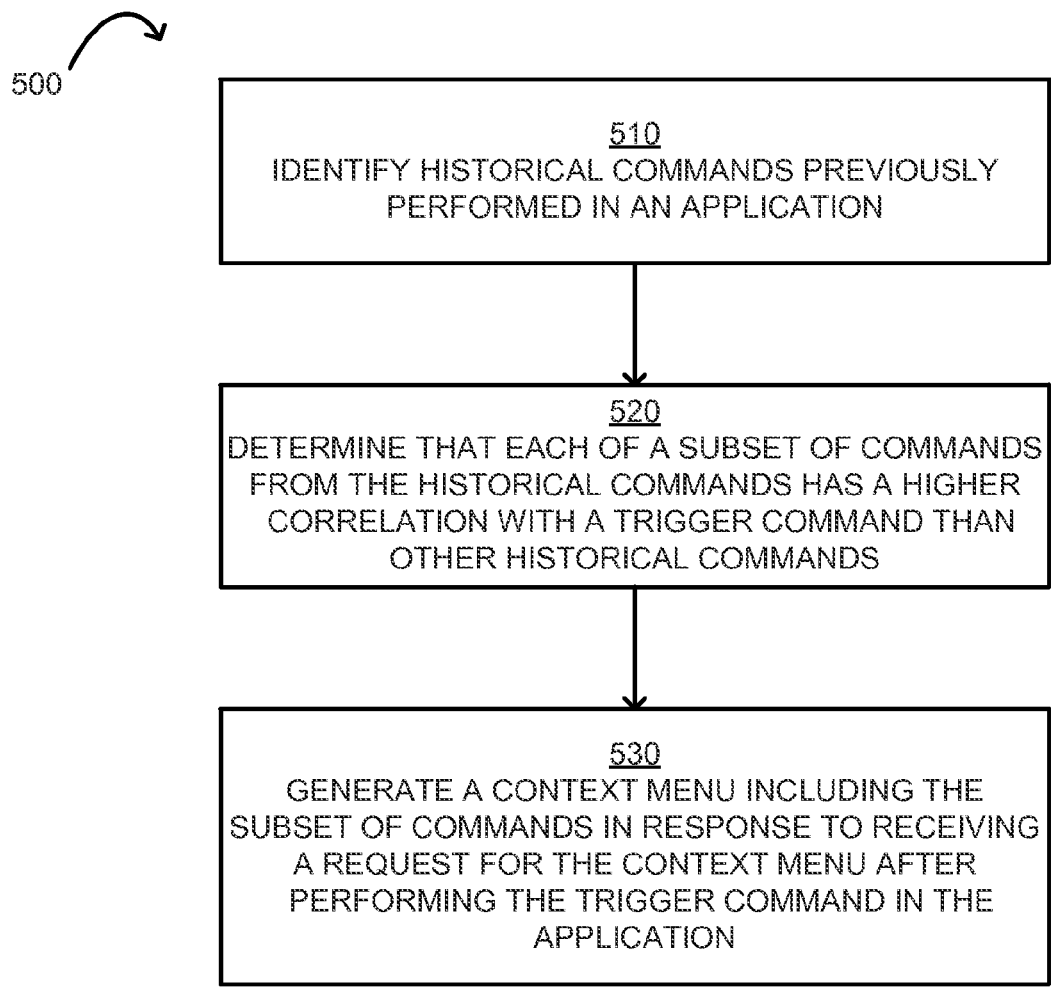
FIG. 9 is a flow chart illustrating an example method for providing a context menu based on predicted commands.

FIG. 9 is a flow chart illustrating an example method 500 for providing a context menu based on predicted commands. For illustrative purposes, the method 500 is described with reference to the system implementation depicted in FIG. 4. Other implementations, however, are possible.

The method 500 involves identifying historical commands previously performed in an application, as shown in block 510. The processor 104 of the computing system 102 can execute the menu module 116 or other suitable programming instructions to identify the historical commands.

In some embodiments, the menu module 116 can differentiate between different types of objects 202. For example, the menu module 116 can limit an analysis of historical commands to commands performed with respect to a specific object 202 or within a specific group of objects 202. The menu module 116 can determine context menu 402 for an object 202 or a group of objects 202 that are associated with a common list of commands that perform the same respective functions with each of the objects 202 in the group.

The method 500 further involves determining that each of a subset of commands from the historical commands has a higher correlation with a trigger command than other historical commands, as shown in block 520. For example, the processor 104 of the computing system 102 can execute the menu module 116 or other suitable programming instructions to determine which of the contextual commands 204 has a higher correlation with a trigger command (e.g., an insertion of the object 202), as described above with respect to FIG. 6.

In some embodiments, the menu module 116 can restrict the analysis to a predetermined number of historical commands. For example, for a given trigger command, the menu module 116 can analyze sequences of commands including five commands to determine which commands are correlated with the trigger command.

In some embodiments, the menu module 116 can associate data describing historical commands with an entity profile for a user or other entity that is logged into an application that includes or uses the menu module 116. An entity profile can be used to limit the number of historical commands analyzed by the menu module 116. For example, the menu module 116 can analyze historical commands and/or sequences of commands performed by an entity during a session initiated by the entity. Limiting the historical commands analyzed by the menu module 116 to historical commands associated with a given profile can be used to generate a context menu that is specific to a given entity.

The method 500 further involves generating a context menu including the subset of commands in response to receiving a request for the context menu after performing the trigger command in the application, as shown in block 530. For example, the processor 104 of the computing system 102 can execute the menu module 116 or other suitable programming instructions to generate the context menu 402 as described above with respect to FIGS. 5-8.

In some embodiments, the menu module 116 can generate a contextual menu using predicted commands based on a size of a display device 112 and/or a size of a graphical interface used by an application. For example, the menu module 116 can determine that a size of a display area for the display device 112 and/or a graphical interface for the application is less than a threshold size. The menu module 116 can provide the context menu 402 that is limited to the subset 302 of the contextual commands 204 based on the size of the display area and/or graphical interface being less than the threshold size. A JavaScript function or other suitable function of a programming language used to implement the menu module 116 can be executed to determine the size of the display area and/or graphical interface.

In additional or alternative embodiments, the context menu 402 can be customized to the size of the display area of the display device 112 and/or a graphical interface for an application. For example, a context menu 402 can include fewer commands for smaller display area or graphical interface sizes and can include more commands for larger display area or graphical interface sizes.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussion utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

The invention claimed is:

1. A method comprising:
   identifying a size limitation of a graphical interface used by an application, wherein the size limitation results from the graphical interface being displayed on a touchscreen computing device;
   determining, based on identifying the size limitation of the graphical interface, that an analysis of historical commands is to be performed for an object that is editable by the application, wherein the analysis of historical commands is used for providing a shortened version of a context menu for the object;
   performing the analysis by identifying a plurality of historical commands previously performed in the application with respect to the object in the application;
   determining that each of a subset of commands from the plurality of historical commands has a higher correlation with a trigger command than others of the plurality of historical commands, wherein determining that each of the subset of commands has the higher correlation with the trigger command comprises, for each command of the subset of commands:

determining a respective frequency at which the command is included in a respective sequence of commands that includes the trigger command and at least one additional command; and determining that the respective frequency exceeds a threshold frequency for selecting commands for the subset of commands; and generating, in response to receiving a request for the context menu after performing the trigger command in the application, the shortened version of the context menu that includes the subset of commands, wherein the subset of commands displayed in the shortened version of the context menu is selected based on the higher correlations so that all commands in the shortened version of the context menu appear in the graphical interface having the size limitation and wherein the shortened version of the context menu is generated based on detecting a sequence of commands including the trigger command and the at least one additional command.

2. The method of claim 1, wherein determining that each of the subset of commands has the higher correlation with the trigger command comprises, for each command of the subset of commands:

determining a respective frequency at which the command is performed subsequent to the trigger command being performed; and determining that the respective frequency exceeds a threshold frequency for selecting commands for the subset of commands.

3. The method of claim 1, wherein identifying the plurality of historical commands previously performed in the application comprises:

identifying an entity profile associated with a session in which the application is being executed; and selecting a record describing the plurality of historical commands based on the record being associated with the entity profile.

4. The method of claim 3, further comprising:

performing a command from the subset of commands in response to an input to the context menu; and updating the plurality of historical commands based on the trigger command and the command from the subset of commands.

5. The method of claim 1, further comprising:

receiving a request for a full context menu including a plurality of available commands in the application, wherein the plurality of available commands includes the subset of commands and at least one additional command; and replacing the shortened version of the context menu with the full context menu in the graphical interface in response to receiving the request for the full context menu.

6. The method of claim 1, wherein generating the shortened version of the context menu comprises excluding others of the plurality of historical commands from the context menu.

7. The method of claim 1 wherein determining that each of the subset of commands has a higher correlation with the trigger command than others of the plurality of historical commands comprises determining correlations based on command use information specific to a particular user, a particular computing device, or a particular instance of the application.

8. A non-transitory computer-readable medium tangibly embodying program code executable by a processor, the program code comprising:

program code for identifying a size limitation of a graphical interface used by an application, wherein the size limitation results from the graphical interface being displayed on a touchscreen computing device;

program code for determining, based on identifying the size limitation of the graphical interface, that an analysis of historical commands is to be performed for an object that is editable by the application, wherein the analysis of historical commands is used for providing a shortened version of a context menu for the object;

program code for performing the analysis by identifying a plurality of historical commands previously performed in the application with respect to the object in the application;

program code for determining that each of a subset of commands from the plurality of historical commands has a higher correlation with a trigger command than others of the plurality of historical commands, wherein determining that each of the subset of commands has the higher correlation with the trigger command comprises, for each command of the subset of commands:

determining a respective frequency at which the command is included in a respective sequence of commands that includes the trigger command and at least one additional command; and determining that the respective frequency exceeds a threshold frequency for selecting commands for the subset of commands; and program code for generating, in response to receiving a request for the context menu after performing the trigger command in the application, the shortened version of the context menu that includes the subset of commands, wherein the subset of commands displayed in the shortened version of the context menu is selected based on the higher correlations so that all commands in the shortened version of the context menu appear in the graphical interface having the size limitation and wherein the shortened version of the context menu is generated based on detecting a sequence of commands including the trigger command and the at least one additional command.

9. The non-transitory computer-readable medium of claim 8, wherein determining that each of the subset of commands has the higher correlation with the trigger command comprises, for each command of the subset of commands:

determining a respective frequency at which the command is performed subsequent to the trigger command being performed; and determining that the respective frequency exceeds a threshold frequency for selecting commands for the subset of commands.

10. The non-transitory computer-readable medium of claim 8, wherein identifying the plurality of historical commands previously performed in the application comprises:

identifying an entity profile associated with a session in which the application is being executed; and selecting a record describing the plurality of historical commands based on the record being associated with the entity profile.

11. The non-transitory computer-readable medium of claim 10, further comprising:

performing a command from the subset of commands in response to an input to the context menu; and updating the plurality of historical commands with the trigger command and the command from the subset of commands.

12. The non-transitory computer-readable medium of claim 8, further comprising:
receiving a request for a full context menu including a plurality of available commands in the application, wherein the plurality of available commands includes the subset of commands and at least one additional command; and
replacing the shortened version of the context menu with the full context menu in the graphical interface in response to receiving the request for the full context menu.

13. A system comprising:
a processor; and
a non-transitory computer-readable medium communicatively coupled to the processor, wherein the processor is configured to execute instructions embodied in the non-transitory computer readable medium and thereby perform operations comprising:
identifying a size limitation of a graphical interface used by an application, wherein the size limitation results from the graphical interface being displayed on a touchscreen computing device;
determining, based on identifying the size limitation of the graphical interface, that an analysis of historical commands is to be performed for an object that is editable by the application, wherein the analysis of historical commands is used for providing a shortened version of a context menu for the object;
performing the analysis by identifying a plurality of historical commands previously performed in the application with respect to the object in the application;
determining that each of a subset of commands from the plurality of historical commands has a higher correlation with a trigger command than others of the plurality of historical commands, wherein determining that each of the subset of commands has the higher correlation with the trigger command comprises, for each command of the subset of commands:
determining a respective frequency at which the command is included in a respective sequence of commands that includes the trigger command and at least one additional command; and determining that the respective frequency exceeds a threshold frequency for selecting commands for the subset of commands; and
generating, in response to receiving a request for the context menu after performing the trigger command in the application, the shortened version of the context menu that includes the subset of commands, wherein the subset of commands displayed in the shortened version of the context menu is selected based on the higher correlations so that all commands in the shortened version of the context menu appear in the graphical interface having the size limitation and wherein the shortened version of the context menu is generated based on detecting a sequence of commands including the trigger command and the at least one additional command.

14. The system of claim 13, wherein determining that each of the subset of commands has the higher correlation with the trigger command comprises, for each command of the subset of commands:
determining a respective frequency at which the command is performed subsequent to the trigger command being performed; and
determining that the respective frequency exceeds a threshold frequency for selecting commands for the subset of commands.

15. The system of claim 13, wherein identifying the plurality of historical commands previously performed in the application comprises:
identifying an entity profile associated with a session in which the application is being executed; and
selecting a record describing the plurality of historical commands based on the record being associated with the entity profile.

16. The system of claim 13, wherein the operations further comprise:
providing the context menu in a graphical interface;
receiving a request for a full context menu including a plurality of available commands in the application, wherein the plurality of available commands include the subset of commands and at least one additional command; and
replacing the shortened version of the context menu with the full context menu in the graphical interface in response to receiving the request for the full context menu.

* * * * *